(12) United States Patent
Rogers et al.

(10) Patent No.: US 9,031,912 B1
(45) Date of Patent: May 12, 2015

(54) SYSTEM, METHOD AND COMPUTER PROGRAM PRODUCT FOR CONTROLLING FILE MIGRATION IN ARCHIVING SYSTEMS

(75) Inventors: Austin Rogers, Austin, TX (US);
William H. Moody, II, Austin, TX (US);
Peter Anthony DeLine, Austin, TX (US)

(73) Assignee: KIP CR P1 LP, New York, NY (US)

( * ) Notice: Subject to any disclaimer, the term of this patent is extended or adjusted under 35 U.S.C. 154(b) by 102 days.

(21) Appl. No.: 13/532,512

(22) Filed: Jun. 25, 2012

(51) Int. Cl.
G06F 7/00 (2006.01)
G06F 17/30 (2006.01)

(52) U.S. Cl.
CPC .................. *G06F 17/30082* (2013.01)

(58) Field of Classification Search
None
See application file for complete search history.

(56) References Cited

U.S. PATENT DOCUMENTS

| | | | | | |
|---|---|---|---|---|---|
| 5,991,753 | A | * | 11/1999 | Wilde | 1/1 |
| 8,006,111 | B1 | * | 8/2011 | Faibish et al. | 713/324 |
| 8,392,676 | B2 | * | 3/2013 | Yata et al. | 711/161 |
| 8,645,653 | B2 | * | 2/2014 | Morishita et al. | 711/165 |
| 2004/0098419 | A1 | * | 5/2004 | Bantz et al. | 707/203 |
| 2006/0206675 | A1 | * | 9/2006 | Sato et al. | 711/161 |
| 2006/0259901 | A1 | * | 11/2006 | Kaplan | 717/168 |
| 2008/0172423 | A1 | * | 7/2008 | Shinkai et al. | 707/203 |
| 2009/0300081 | A1 | * | 12/2009 | Ueoka | 707/204 |
| 2012/0210068 | A1 | * | 8/2012 | Joshi et al. | 711/122 |
| 2013/0325814 | A1 | * | 12/2013 | Carter | 707/661 |

OTHER PUBLICATIONS

Pease, David, et al., "The Linear Tape File System," IBM Yamato Lab, 2010, 8 pages, #978-1-4244-7153-9/10, IEEE, U.S.
Linear Tape File System (LTFS) Format Specification, LTFS Format Version 2.0.0., Mar. 11, 2011, 69 pages, accessed on Sep. 29, 2011 at http://www.trustito.com/LTFS_Format_To%20Print.pdf.
Long Term File System Information Center 1.2.1.1, Overview, LTFS Format, IBM Corp., 2010, 1 pg.
HP Linear Tape File System (LTFS), HP OEM Newsletter, Sep. 2010, 15 pgs.
Anyone Using LTFS with LTO-5? Post, Reduser.net, Sep. 29, 2010, 3 pgs. at <<http://reduser.net/forum/showthread.php?t=50309>>.
Coolen, Ilja, IBM's Long Term Filesystem, short term usage? Apr. 26, 2010, 3 pgs. at <<http://www.iljacoolen.nl/2010/04/ibms-long-term-filesystem-short-term-usage/>>.
Glob (programming), Wikipedia, last updated Apr. 6, 2012, 4 pgs from <<http://en.wikipedia.org/wiki/Glob (programming)>>.
Pecoraro, Joseph, Globbing, Tricks, Unix Tutorial, 2 pgs. from <<hftp://bogojoker.com/unix/tricks/globbing.html>>.

* cited by examiner

*Primary Examiner* — Debbie Le
*Assistant Examiner* — Hasanul Mobin
(74) *Attorney, Agent, or Firm* — Sprinkle IP Law Group

(57) ABSTRACT

Embodiments provide a solution for controlling file migration in archiving systems. A networked device can be configured to, during an archiving process, exclude or otherwise prevent files from migrating to tape or another archiving appliance connected to the networked device which, in one embodiment, implements an archive node appliance. The archive node appliance may be configured to start an archiving process to store a file. The archiving process may cause the file to be stored in a share or directory on the archive node appliance. The archive node appliance may check a file exclusion policy associated with the share or directory to determine whether the file is to be excluded from migration. The archive node appliance may stop the archiving process if it determines that the file exclusion policy contains a pattern that matches the file name. One example of such a pattern can be a user-defined glob.

14 Claims, 5 Drawing Sheets

SYSTEM, METHOD AND COMPUTER PROGRAM PRODUCT FOR CONTROLLING FILE MIGRATION IN ARCHIVING SYSTEMS

TECHNICAL FIELD

This disclosure relates generally to the field of file archiving using media libraries. More particularly, this disclosure relates to archiving applications and appliances. Even more particularly, this disclosure relates to archiving applications and appliances capable of excluding or otherwise preventing certain files from migration, useful for solving usability problems unique to archiving systems.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data is unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, for example, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router, etc.), the tape libraries may be further addressed by bus number.

In current tape library systems, each tape library may present itself as an independent entity on the network. Each host in these systems maintains a view (i.e., a table of target numbers, LUNs and element numbers) of each of the tape libraries. Using this address information a host can format commands to the tape library to perform read/write, backup and other operations.

For large scale data-storage, tape libraries are a cost-effective solution. The tradeoff for their large capacity is their access time is slower than primary storage devices as well as direct access storage devices. As those skilled in the art can appreciate, access to data in a library can take from several seconds to several minutes. Because of their slow access time, tape libraries are primarily used for backups and as the final stage of digital archiving.

Recently, the Ultrium Linear Tape Open (LTO)-5, specification for tapes (hereby incorporated by reference in its entirety for all purposes) has included support for partitioning. The Linear Tape File System (LTFS) Format Specification by IBM and the LTO Program (also hereby fully incorporated by reference in its entirety for all purposes) makes use of this partitioning support to define a tape format. The LTFS tape format defines a file system for LTO-5 tapes using an eXtensible Markup Language (XML) schema architecture and was utilized in conjunction with the IBM LTO Gen5 Drive. This file system support allows the use of an LTFS-formatted tape as if it were a file system. Files and directories may appear in a directory listing, files may be dragged and dropped from tape, data may be accessed at the file level, etc. With LTFS, tape media can be used like other storage media (e.g. flash drive, hard disk drives, etc.).

Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

Although LTFS makes the use of a single tape much simpler, it does, however, have limitations. As defined in the current specification the LTFS file system may be limited to a single tape. If it is desired to use multiple LTFS tapes these tapes are mounted one at a time or additional support is provided. While the capacity of an LTO-5 tape is relatively high (e.g., around 1500 GB to 3.0 TB or greater), in the realm of business data and backup applications this is a major restriction.

Another significant limitation of the LTFS specification is that it does not include support for tape libraries. The LTFS specification only defines a single tape/tape drive combination. After the tape drive is loaded with the tape the file system may be mounted after which it becomes useable. Manual intervention is required to unload one tape and load another if access to files on a different tape is desired.

To address these and other LTFS limitations, certain archiving applications and appliances may be configured to function at an interface layer between host machines and tape libraries. In the simplest terms, an archiving application may receive files from host machines and write the files to a tape in a tape library that employs LTFS. An archiving system, therefore, may comprise an archiving application and a tape library. Once the files are in the archiving system (i.e., received by the archiving application), they are destined to be migrated to tape and archived for long term storage.

SUMMARY

Embodiments provide a networked device which uses Linear Tape File System formatting to order tape data into standard file classes to allow effortless data retrieval and which is capable of excluding or otherwise preventing certain files from migrating to tape, useful for solving usability problems unique to archiving systems. The networked device may be physically connected to a tape library where the tape is loaded in a tape drive. The amount of data being written may be configured to accommodate to a partition scheme defined in the LTFS specification. The data may be from one or more files. In one embodiment, the one or more files are of a sufficient amount to write two wraps or a multiple thereof on a tape. In one embodiment, the networked device implements an archive node appliance.

In one embodiment, the archive node appliance may comprise ports for connecting to one or more networks and a tape library, a processor, and at least one non-transitory computer readable medium storing instructions translatable by the processor to perform a method of preventing certain files in an archiving system from migrating. In one embodiment, the method may comprise starting an archiving process for archiving a file in the archiving system, the file being stored in a shared volume or directory on the archive node appliance and having a file name. The shared volume or directory may be associated with a file exclusion policy. The file exclusion policy may contain a pattern or patterns of file names. Such a pattern or patterns may be defined or edited via a user interface. Any file with a matching file name is to be excluded from migrating from the archive node appliance. Any file that is not to be excluded may be migrated to one or more tapes in the tape library or to another or more archive node appliances.

In one embodiment, the archiving process is terminated if the file is to be excluded from migrating further in the archiving system according to the file exclusion policy associated with the directory where the file resides on the archive node appliance. In one embodiment, there can be multiple file exclusion policies associated with the directory, each specifying a set of patterns. After the archiving process is terminated, the file exists only on the archive node appliance and is never migrated from the archive node appliance, stubbed, or replicated.

A computer program product implementing a method of controlling file migration in an archiving system disclosed herein may comprise at least one non-transitory computer readable medium storing instructions translatable by the archive node appliance to perform the method. Embodiments disclosed herein may implement any suitable computer readable medium, including those known in the art (e.g., optical disk, magnetic disk, flash memory, RAM, ROM, EEPROM or other computer readable medium).

Embodiments disclosed herein may provide a number of advantages. For example, the method of controlling file migration in an archiving system may allow the archive node appliance to ignore certain temporary files, thereby preventing undesired behaviors by certain software applications that created such temporary files. The method of controlling file migration in an archiving system may also allow the archive node appliance to act more like network attached storage rather than as an archiving appliance.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
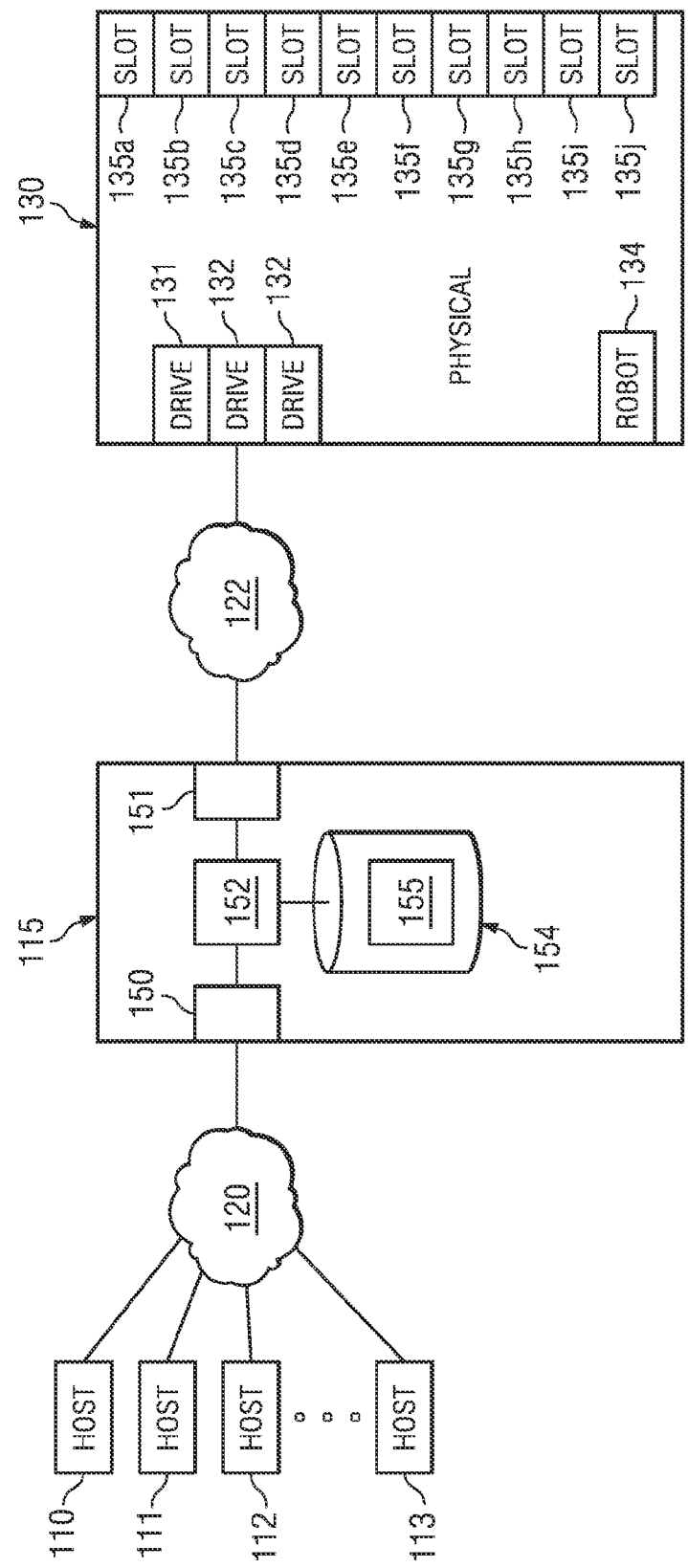
FIG. 1 depicts a diagrammatic representation of one embodiment of a system comprising an Archive Node Appliance.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, an example hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more non-transitory computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

This disclosure relates to a new archive solution that uses Linear Tape File System formatting to order tape data into standard file classes to allow effortless data retrieval. This new archive solution may be embodied in an archiving system. In one embodiment, the archiving system may comprise an archive node appliance and a tape library. StrongBox, available from Crossroads Systems, Inc. of Austin, Tex., represents one example of an archive node appliance. This archive node appliance is non-proprietary and works with existing systems. Thus, any existing tape data (with LTFS formatting) can be ingested into the archive node appliance and any LTFS formatted tape can be introduced and read by any LTFS enabled device.

As discussed above, recent advances in the LTFS technology allow an operating system that supports LTFS to mount an LTFS-formatted tape and read and write the files thereon through an archive node appliance. While this makes the use of a tape library much simpler, it also presents unexpected challenges in operating and managing archiving systems.

One challenge pertains to the fact that certain software applications, especially those for managing files and directories, can create temporary files in the course of normal operations. If these files are inadvertently archived, unexpected behaviors could result. The exact nature and consequences of such unexpected behavior vary from application to application and from file to file. For example, when a temporary file created by a software application is inadvertently queued for archiving, it is locked down by the archiving application as a read-only file. However, the software application that created the temporary file may need to write to the temporary file as part of its normal operation. When the software application that created the temporary file could not write to the temporary file, it may cease to function properly or simply crash.

Another challenge pertains to the fact that users may wish to use an archiving system in unexpected ways. For example, in some cases, it may be desired to keep certain files on an archiving system, to mix archived and unarchived content on the archiving system, and/or to use the archiving system as both an archive appliance and a network attached storage device. A user might intentionally want certain files to be instantly available at all times, not want certain files to be written to tape for security reasons, or want to retain the ability to modify certain files on a share while archiving others.

Considering these issues, one approach may involve delaying the archiving of newly written (and communicated from one or more host machines) files for a period of time. However, this approach may not yield the desired results at all times as files that should not be archived may not be deleted in time to prevent archiving.

Embodiments disclosed herein can address the aforementioned issues that are unique to archiving systems, greatly enhancing the functionality of an archive node appliance and usability of any archiving system employing the archive node appliance. To this end, it may be helpful to first describe an example archive node appliance.

FIG. 1 depicts a diagrammatic representation of a system in which a media library is managed to present a network based file system to a plurality of hosts (i.e., host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this example, hosts 110, 111, 112 and 113 are coupled to Archive Node Appliance 115 via network 120. Network 120 can comprise the Internet, a LAN, a WAN, a SAN, a wireless network, or any other communications link, network or protocol known in the art. For example, network 120 may comprise an Ethernet based network employing TCP/IP.

In the example of FIG. 1, Archive Node Appliance 115 is connected to media library 130 via network 122 (Archive Node Appliance 115 and media library 130 may represent an archiving system collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in FIG. 1, it should be understood that Archive Node Appliance 115 can be implemented in a variety of manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135a-j). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that, although FIG. 1 depicts only a single media library, Archive Node Appliance 115 can be implemented to connect to and utilize multiple media libraries.

Archive Node Appliance 115 comprises a computer processor 152 and a computer readable memory 154 (e.g., RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art. In one embodiment, computer instructions 155 can include code implementing a methodology disclosed herein. In one embodiment, the methodology is embodied in a module residing in an Archive Node Appliance. Example embodiments of the methodology, module, and Archive Node Appliance are described below.

In operation, computer instructions 155 can be executable such that Archive Node Appliance 115 can present a network based file system (i.e. a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5 compliant drives and tapes in media library 130 may be formatted according to the Linear Tape File System (LTFS) Format Specification, which is incorporated by reference herein. Computer instructions 155 may be executable to store files received through a network based file system on LTFS tapes in media library 130 and maintain mapping information between the files visible through the network based file system and the location of those files in media library 130.

Files visible through a network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, and use LTFS to mount the LTFS file system on the tape and access the file to, for example, read the file (as a whole or the remainder of the file) into the intermediate storage.

To increase performance, in some embodiments, it may be desired to store files on computer readable memory 154 when they are initially received, and migrate these files to media library 130 at a later point. Computer instructions 155 may therefore be executable to store files stored by hosts using the network based file system to computer readable memory 154. At some later point, the computer executable instructions 155 may be executable to migrate the file from computer readable memory 154 to media library 130. In this case, computer executable instructions 155 are executable to maintain mapping information between the files visible through the network based file system and the location of those files on computer readable memory 154 or media library 130.

The use of LTFS in conjunction with media library 130 can afford a number of advantages when employed by an Archive Node Appliance 115 to implement a networked based file system. One important advantage is that the file system structure presented through the file system may be substantially mirrored on the tapes of media library 130. Accordingly, if there is a failure of Archive Node Appliance 115 or media library 130, the files on the tapes of media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

Figure 2:
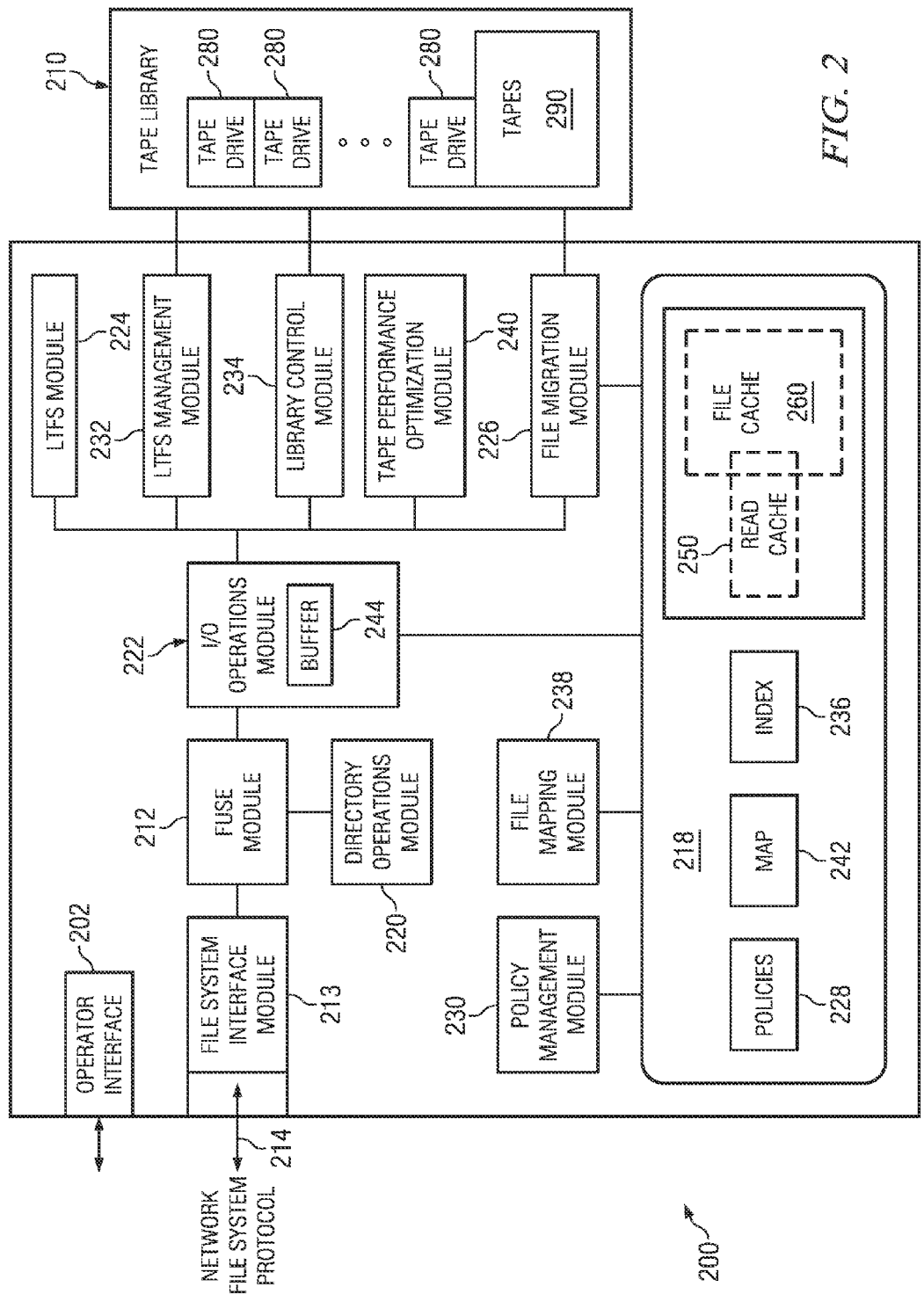
FIG. 2 depicts a diagrammatic representation of one embodiment of a system comprising an Archive Node Appliance connected to one embodiment of a tape library.

Turning now to FIG. 2, one embodiment of a functional architecture for an Archive Node is depicted. Archive Node Appliance 200 may provide an operator interface 202 through which Archive Node Appliance 200 may be configured. Operator Interface 202 can be used to configure, monitor, and control the entire system. Such an operator interface 202 may be provided, for example, using a network based interface such as a set of web pages or the like. In the example of FIG. 2, Archive Node Appliance 200 is connected to tape library 210, which comprises a set of tape drives 280 and tapes 290, some of which may contain LTFS formatted tapes. Those skilled in the art will appreciate that a tape drive that is compatible with LTFS does not necessarily only use LTFS to read/write tapes that are put into it. For the sake of clarity, some details such as slots in tape library 210 are not shown in FIG. 2. In one embodiment, each tape in tape library 210 may be used to store data that is compressed, data that is encrypted, data that is both compressed and encrypted or data that is neither compressed nor encrypted. A tape in tape library 210 may initially not be formatted with LTFS until it is needed—at which time it will be formatted according to the policies of the file(s) to be written on the tape, either compressed or uncompressed.

In the example of FIG. 2, Archive Node Appliance 200 comprises Filesystem in Userspace (FUSE) module 212 that may present a single file system (or 'volume' in one implementation) to a local operating system. That file system can then be presented to host device(s) on the network via network file system interface module 213. Network file system interface module 213 provides access to all or a portion of the FUSE file system as one or more shared volumes (e.g., as a hierarchical file system with directories, etc.) that can be accessed using an interface that operates according to network file system protocol 214 such as NFS, CIFS, FTP, REST, etc. Example interfaces include NFS, CIFS, FTP, REST interfaces. Other means of presenting the one (or more) file systems/volumes to the network may also be implemented. Data associated with the one or more shared volumes can be stored on one or more partitions of data store 218 (a computer readable memory), where the structure of the partitions of data store 218 may, or may not, correspond to the structure of the shared volume(s) presented by network file system interface module 213.

Directory operations module 220 is configured to process any directory operations that are received by FUSE module 212. I/O operations module 222 is configured to process any input or output operations involved with the reading or the storing of files associated with the file system presented by FUSE module 212. These operations include, for example, the writing of files to data store 218, the reading of files from data store 218, the deletion of files from data store 218, the reading of files from a tape in tape library 210 or other operations associated with data store 218 or tape library 210.

These I/O operations may involve the use of LTFS module 224, LTFS management module 232, library control module 234, tape performance optimization module 240, file migration module 226, and index 236. The location of each tape within tape library 210 may be maintained in index 236 (e.g., in which slot or drive each tape is located, in which library the tape is located if multiple tape libraries are in use, etc.). Additionally, in one embodiment, information on what type of data (encrypted, compressed, unencrypted, uncompressed, etc.) is stored on each tape may also be maintained in index 236.

Library control module 234 is configured to control the movement of tapes in tape library 210, including ejecting the tapes from the drives of tape library 210, and the movement of tapes to and from slots of tape library 210 and in and out of drives of the tape library using the robot. LTFS management module 232 is configured to mount or unmount the LTFS file system on a particular tape in a drive of tape library 210. LTFS module 224 is configured to perform LTFS operations with respect to an LTFS mounted file system.

LTFS module 224, LTFS management module 232, Library control module 234, and index 236 may also be utilized by file migration module 226. File migration module 226 is configured to move files from data store 218 to tape library 210 based on policies 228. In one embodiment, file migration module 226 may implement the file migration methodology disclosed herein. File mapping module 238 maintains map 242 which correlates a file visible through the FUSE file system to its corresponding location in tape library 210. Specifically, a mapping between the location (for example the path) and name of the file with respect to the FUSE file system, the name and location of that file in the data store 218 and the name and location of that file on one or more tapes in tape library 210 may be maintained in map 242.

Policies 228 may, or may not be, user configured and may be associated with storage of the files or the migration of files from data store 218 to tapes in tape library 210. Such policies may specify, for example, how long to wait before migrating a file (referred to herein as a migration timeout period), whether the files are to be replicated when migrated (e.g., stored in conjunction with multiple Archive Nodes), how many copies of the file to keep, where multiple copies may be kept on different tapes, whether the file is to be encrypted or compressed, etc. In one embodiment, policies 228 may include file migration policies implementing the file migration methodology disclosed herein. File migration policies, which will be further described below, may be utilized to exclude certain files from migration in an archiving system.

Policies 228 may be defined with respect to the directories presented with respect to FUSE module 212 such that those policies may be defined with respect to all files within that directory. Policy management module 230 allows these policies to be managed (e.g., created, updated, defined, deleted, modified, etc.) by a user or otherwise. Policies can be defined at any level of the directory structure provided by FUSE module 212. Because a directory presented by FUSE module 212 may be presented as a shared volume ("a share") by network file system interface module 213, a policy that applies to the directory may also apply to the share.

In operation then, Archive Node Appliance 200 may present a network based file system accessible through an interface, where the files associated with the network based file system may be stored on tape library 210 according to a file system structure that substantially mirrors the file system structure of the presented network based file system. In one embodiment, mirroring the file system structure of the presented network based file system means that at least a portion of the path of the location of the file as it is stored on tape library 210 may be substantially similar to the path of the location of the file as it is presented through the file system.

More specifically, users at host devices coupled to the Archive Node Appliance 200 may perform directory operations and store or read files using an interface for the network based file system provided by the Archive Node Appliance 200. In accordance with these user initiated operations, commands in the network file system protocol 214 employed by the interface may be received at the Archive Node Appliance 200 and implemented by FUSE module 212 with respect to the partitions of data store 218. If the command is associated with a directory operation it may be processed by directory operations module 220. If the command is for the storing of a file, the I/O operations module 222 may write this file to a location in the data store 218. Map 242 may be updated to comprise a mapping between the location and name of the file with respect to the FUSE file system and the name and location of that file in the data store 218.

In one embodiment, the file is stored in data store 218 according to the one or more policies that apply to that file. For example, if a policy that applies to the file specifies that the file should be compressed the file may be compressed before the file is stored in the data store 218. Similarly, if an applicable policy specifies that the file is to be encrypted the file may be encrypted before it is stored in data store 218. In certain embodiments, a self-encrypting disk, full disk encryption or a RAID controller which performs encryption may be utilized in conjunction with data store 218, such that all files stored in data store 218 may be encrypted by the disk or controller when the file is stored to data store 218. In such cases, all files stored to data store 218 may be encrypted when stored to data store 218 and decrypted when read from data store 218.

Based on one or more of the policies 228, at some later point a file may be migrated to tape library 210. As policies 228 may be defined based on a location associated with the presented file system, policies associated with the location (e.g., directory, share, etc.) where the file is stored may be determined from policies 228 and the determined policies applied to migrate the file.

As the file may be received over a network, errors may occur during the transmission of the file or the storage of the file to the data store. To account for network errors or the like, in one embodiment, a time period referred to as a migration timeout period can be utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance. As another example, a policy specifying an amount of data to be written on a tape may be defined using policy management module 230 through operator interface 202 of Archive Node Appliance 200. Once a file is selected for migration, one or more policies 228 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using index 236. If the appropriate tape is not currently in a drive of the tape library, library control module 234 may be utilized to load the appropriate tape into a drive of tape library 210. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 232. File migration module 226 may use LTFS module 224 to copy the file from data store 218 to the appropriate tape at a location on the tape which corresponds to the location of the file as presented through the file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by Archive Node Appliance 200. Additionally, when the file is copied to the mounted LTFS file system on the appropriate tape, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to LTFS module 224 that data to be stored on the tape is to be compressed. LTFS module 224 may configure the drive holding that tape to compress data such that when the file is stored to the tape using LTFS module 224 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles other operations including the encryption of the data that are transparent to LTFS.

When a command to read a file is received, map 242 may be consulted to determine the location of the file (e.g., whether it is located in data store 218, on a tape in tape library 210 or both). If the requested file is completely on data store 218, I/O operations module 232 may respond to the read of the file using the file as stored in data store 218. If the file is on a tape (and not entirely in data store 218), the tape on which the file is located may be determined using map 242. Index 236 and library control module 234 can then be utilized to determine if the tape is in a drive, and if not, to load the appropriate tape into a drive of tape library 210. The file system on the tape may be mounted using LTFS management module 232. I/O operations module 222 can then use LTFS module 224 to access the file on the tape and respond to the read of the file.

In the example shown in FIG. 2, read cache 250 may be maintained on data store 218. Read cache 250 may comprise a first portion of each file stored in data store 218 using a network based file system presented by Archive Node Appliance 200. When a file is read, then, if any portion of the file is to be read from a tape, the first portion of the read file that is stored in read cache 250 may be used to respond to the read, while substantially simultaneously accessing the file on the tape. Since the first portion of this file is stored in read cache 250 on data store 218, it can be accessed quickly enough that a timeout on commands can be avoided while the file on the tape is accessed. The remainder of the file can then be read from the tape and used to respond to the commands. The size of the first portion of each file may be user-configurable, based on system parameters, or defined in some other manner.

It will be noted that read cache 250 may comprise first portions of none, all, or some subset of, the files that are stored in conjunction with the network based file system. For example, if data store 218 is corrupted or otherwise unusable, when data store 218 is replaced, read cache 250 may not comprise any first portions of the files. Read cache 250 may then be repopulated as files are accessed by users through the network based file system. During this repopulation then, read cache 250 may comprise first portions of some subset of the files that are stored in conjunction with the network based file system (a process that can be referred to as "stubbing" the files).

Accordingly, in some embodiments, when a file is read if any portion of the file is to be read from tape it can be determined if there is a first portion (or a 'stub') of that file in read cache 250. If there is, that first portion may be used to respond to the read as detailed above. If, however, there is not a first portion of the read file in read cache 250, the file may be read from tape and used to respond to the read. Additionally, the file data read from tape may be used to repopulate read cache 250 by storing the first portion of the read in read cache 250 at that time.

The host device may send a READ command for a certain amount (e.g., 64K or a different amount) of the file to Archive Node Appliance 200. I/O operations module 222 can delay the response to this READ command as long as possible without a timeout resulting (e.g., 20 seconds, 29 seconds, or another time period below the 30 second timeout). After the delay, I/O operations module 222 will respond to the READ command with the data requested. I/O operations module 222 may continue to delay responses to subsequent READ commands and utilize data from read cache 250 to respond to the READ commands until data from the first portion of the file is exhausted or the LTFS file system on the appropriate tape is mounted and the file on the tape can be accessed using LTFS module. I/O operations module 222 may continue to delay responses and dynamically switch between delaying responses and not delaying responses as needed.

In addition to delaying responses, Archive Node Appliance 200 can return less data than requested by the host. For example, Archive Node Appliance 200 may return 1K instead of the requested 64K. Whether Archive Node Appliance 200 returns less data than the amount requested may depend on the network file system protocol, host operating system or other factors. Returning less data than requested provides the advantage that the read cache can be smaller.

I/O operation module 222 may then use LTFS module 224 to access the file on the tape and respond to subsequent READ commands for the file. More specifically, in one embodiment, I/O operations module 222 may utilize LTFS module 224 to access the file on the appropriate tape and read the file from the tape into buffer 244. Subsequent READ commands for the file may be responded to using the data in buffer 244.

Furthermore, in some embodiments, in addition to reading the file into buffer 244, the file may also be read into file cache 260 on data store 218. File cache 260 may be an area on data store 218 utilized for temporary storage of files and may be managed according to almost any cache management technique desired.

When the tape is no longer needed for writing data to and/or reading data from, the file system on the tape may be unmounted using LTFS management module 232. When an LTFS mount is terminated via an unmount command, the current index which is kept in index 236 is written to the LTFS tape.

Figure 3:
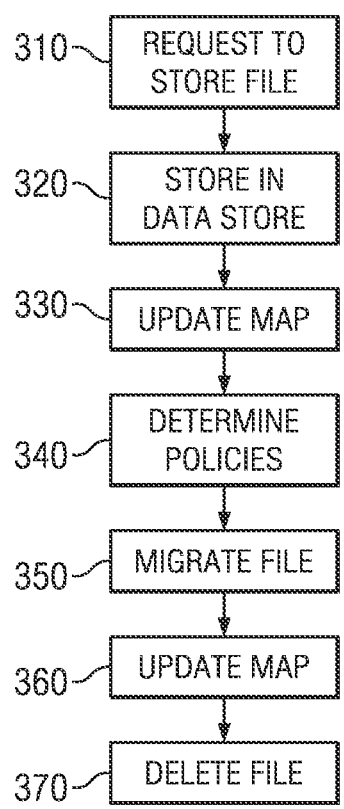
FIG. 3 depicts a flow diagram of an example method of storing a file in an archiving system.

At this point, it may be helpful to provide an example of file migration using an embodiment of an archiving system comprising an Archive Node Appliance. Referring to FIG. 3, at step 310 a request (which may come from a host machine or another Archive Node Appliance and which may comprise multiple commands in a file system protocol) to store a file may be received at the Archive Node Appliance, where the file may be associated with a name and a path as visible through the network based file system implemented by the Archive Node Appliance. For example, the path of the file may be path/patient_records and the file name may be Patient1.doc. The file is then stored on a location on the data store of the Archive Node Appliance at step 320, where the file may have a different name and be located at a path associated with the data store. For example, the path of the file as stored on the data store may be /data3 and the file name may be 550e8400-e29b-41d4-a716-446655440000.

As discussed above, the file can be stored in the data store according to one or more policies that apply to that file. For example, if a policy that applies to the file (for example, the policy is associated with the location associated with the network based file system where the file is stored) specifies that the file should be compressed the file may be compressed before the file is stored in the data store. Similarly, if an applicable policy specifies that the file is to be encrypted the file may be encrypted before it is stored in the data store.

The map can then be updated at step 330 to associate the name and the path of the file as visible through the network based file system with the path and name of the file as stored on the data store. Thus, in this example the path/patient_records and file name Patient1.doc, as visible through the network based file system is associated with the path/data3 and file name 550e8400-e29b-41d4-a716-446655440000 associated with the file as stored in the data store.

Subsequently, one or more policies to be applied to the file can be determined at step 340. The policies may be applied in conjunction with the migration of the file at step 350. As discussed above, in one embodiment one policy may specify that a migration timeout period is to be applied to the file before the file is migrated. This migration timeout period may specify a time period such that an amount of time equal to the migration timeout period may be allowed to elapse before the file is migrated. Thus, if such a policy exists the migration timeout period may be allowed to elapse before the file is migrated.

In instances where the file was received from another Archive Node (e.g., in an embodiment where the Archive Node is being used in a clustered architecture) as part of a replication of that file, however, even if a policy specifying a migration timeout period applies to the file the file may be migrated substantially immediately (as the migration timeout period may, for example, have been allowed to elapsed in conjunction with the migration of the file at another Archive Node Appliance in the cluster, such as the Archive Node Appliance from which the file was received).

To migrate the file, one or more tapes on which to store the file may be determined. This determination may be based on the policies that have been determined to apply to that file. For example, the number of tapes determined may be based on a policy specifying that the file is to be maintained on multiple tapes. If so, two different tapes on which to store the file may be determined. If a policy to apply to the file specifies that the file is to be encrypted a tape comprising encrypted data may be selected. Similarly, if a policy to apply to the file specifies that the file is to be compressed a tape comprising compressed data may be selected. Assume for purposes of example that the tape on which it is determined to store the file has a TapeID of AN02394.

Each of the tapes on which it is determined to store the file can then be loaded into a drive, if it is not already in a drive, and the LTFS file system mounted. Specifically, the tape may be located using the index that maintains the location of each of the tapes in the library and loaded into a drive. The file can then be copied from its location on the data store to a location on the tape. In one embodiment, a path that corresponds to the path of the file as visible through the network based file system may be created on the tape using the LTFS file system if it does not already exist. The file can then be saved using the name that corresponds to the name of the file as visible through the network based file system. Continuing with the above example, the path/patient_records may be created on the tape having TapeID AN02394 if it does not exist and the file may be saved as Patient1.doc on this tape.

In one embodiment, before or during the copying of the file to the mounted LTFS file system on the tape, actions may be taken to implement policies applicable to the file. For example, if a policy specifies that the file is to be replicated it may be sent to another Archive Node Appliance or if a policy that applies to the file specifies that the file should be compressed, the file may be compressed before the file is stored on the tape. Similarly, if an applicable policy specifies that the file is to be encrypted the file may be encrypted before it is stored on the tape.

The map can then be updated at step 360 to associate the tape on which the file is stored, the name and the path of the file as visible through the network based file system, the path and name of the file as stored in the data store and the path and name of the file as stored on the tape. Thus, in this example the path/patient_records and file name Patient1.doc, as visible through the network based file system is associated with TapeID AN02394, the path/data3 and the file name 550e8400-e29b-41d4-a716-446655440000 associated with the file as stored in the data store.

At step 370, the file, or portions thereof, may be deleted from the data store. In some embodiments, as it is desired to maintain the first portion (also referred to herein as a 'stub') of a file in a read cache in the data store, all portions of the file except this first portion may be deleted from the data store. It will be noted therefore, that in certain embodiments, the path and name of the file in the map that is associated with the file as stored in the data store may describe the location of the first portion of the file stored in the read cache.

Notice in the above example, although in one embodiment a migration timeout period can be applied to the file before the file is migrated, the file is ultimately migrated (to one or more tapes and/or to another one or more Archive Node Appliances) and subsequently deleted from the data store, leaving only a stub or stubs thereof in the data store. This approach works well for files that are meant to be archived for long term storage. However, as discussed above, in some cases, it may be desired to keep the file on the Archive Node Appliance. This unexpected desire can be considered as counterintuitive to the very nature and purpose of archiving systems. As those skilled in the art can appreciate, archiving systems are designed and configured to archive files for long term storage. Files provided to or otherwise reside on an archiving system are processed for storage on tape. As part of that process, an archiving system may lock down a file as read-only and queue the file for migration to a tape. In a typical archiving system, this type of archiving process applies to all the files on the system. Furthermore, as the above example illustrates, once a file is migrated from the Archive Node Appliance, it is not kept in its entirety on the Archive Node Appliance. At best, there may be a stub or stubs of the file and not a complete file remaining on the Archive Node Appliance. What is needed, therefore, is a new archive solution that will allow a user and/or the Archive Node Appliance to control the archiving process such that certain files, in their complete form, can be excluded or otherwise prevented from archiving.

Figure 4:
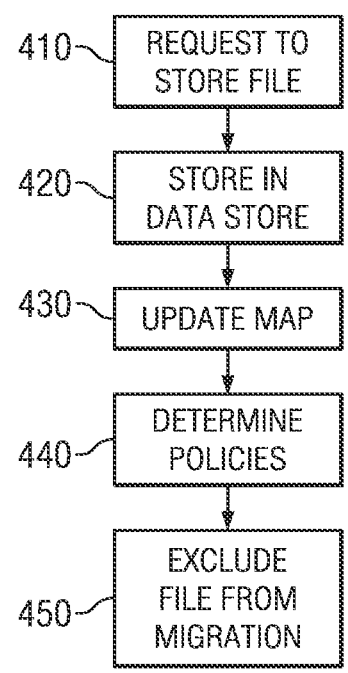
FIG. 4 depicts a flow diagram of an example method of controlling file migration in an archiving system according to one embodiment disclosed herein.

One example of a file migration methodology implementing the new archive solution is depicted in FIG. 4. At step 410, a request (which may come from a host machine or another Archive Node Appliance and which may comprise multiple commands in a file system protocol) to store a file may be received at the Archive Node Appliance in the same or a similar manner as described above with reference to step 310. At step 420, the file can be stored on a location on the data store of the Archive Node Appliance in the same or a similar manner as described above with reference to step 320. At step 430, the map can be updated, in the same or a similar manner as described above with reference to step 330, to associate the name and the path of the file as visible through the network based file system with the path and name of the file as stored on the data store.

At step 440, one or more policies to be applied to the file can be determined. As discussed above, a policy management module of the Archive Node Appliance may allow various policies to be managed (e.g., created, updated, defined, deleted, modified, etc.) by a user or otherwise. These policies can be defined at any level of the directory structure provided by the FUSE module of the Archive Node Appliance. Because a directory presented by the FUSE module may be presented as a share (by a network file system interface module of the Archive Node Appliance), a policy that applies to the directory may also apply to the share. In one embodiment, a policy defined with respect to a directory may apply to all files within that directory.

Figure 5:
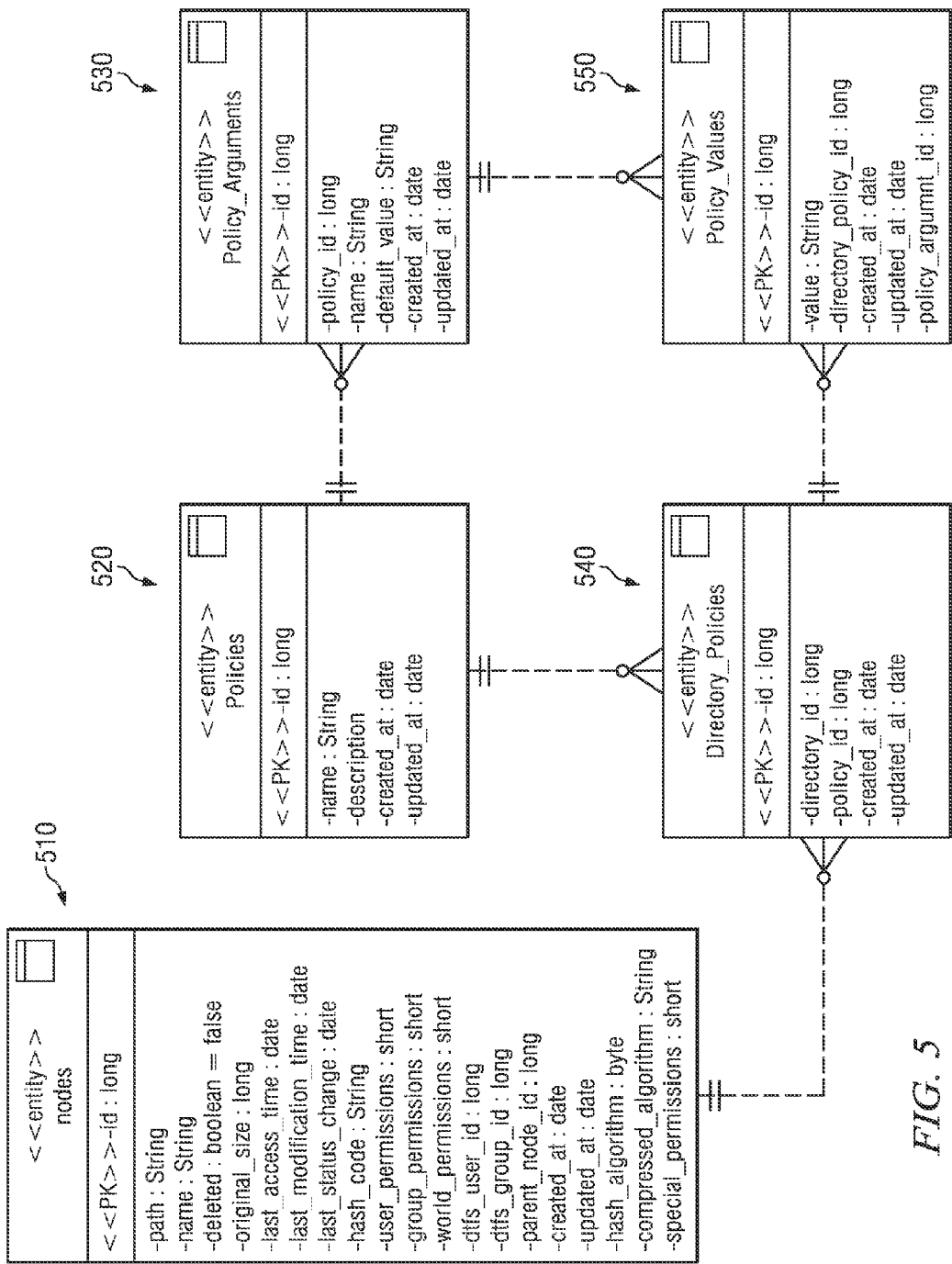
FIG. 5 depicts a diagrammatic representation of database tables used in one embodiment to track policies associated with the directories tied to file shares.

FIG. 5 depicts a diagrammatic representation of database tables used in one embodiment to track policies associated with the directories tied to file shares. In one embodiment, database table 510 is configured for storing information about the files and directories for the FUSE filesystem. As users write files to Archive Node Appliances (and hence archiving systems), records are created in this table. For example, as illustrated in FIG. 5, database table 510 may comprise a column 'name' for storing the name of a file or directory. When the user creates a file share, a top-level directory is created in this table and all policies can be associated with this top-level directory. Table 1 below illustrates an example of database table 510 in which the record with an id '3' represents a top-level directory associated with a file share.

TABLE 1

| id | name |
|---|---|
| 1 | / |
| 2 | shared |
| 3 | 3dc61e41-5ef8-4392-85a6-97c432c8019e |

In one embodiment, database table 520 is configured for storing a list of policies that can be defined in an Archive Node Appliance. For example, as illustrated in FIG. 5, database table 520 may comprise a column 'name' for storing a name for a policy and a column 'description' for storing a description of the policy's purpose. Table 2 below illustrates an example of database table 520 in which the File Exclusion policy has an id '9'.

TABLE 2

| id | name | description |
|---|---|---|
| 2 | Read Cache | Read cache policy |
| 7 | Delayed Action | Delayed Action Policy |
| 9 | File Exclusion | File Exclusion |
| 3 | Compression | Compression Policy |
| 8 | File Retention | File Retention Policy |
| 10 | Prevent Deletion | Delete Policy for Nodes |
| 1 | Number of Copies in Library | N-Copy Policy |
| 11 | Number of Export Copies | Export Policy |
| 12 | Replication | Replication Policy |

In one embodiment, database table 530 is configured for storing arguments required to define each policy. Each record in database table 520 can have one or more policy arguments. As illustrated in FIG. 5, database table 530 may comprise a column 'name' for storing a name for a policy argument 'policy_argument', a column 'policy_id' for storing the foreign key id of the associated policy in the policies table (database table 520) and a column 'default_value' for storing a default value that will be used when a new file share is defined. Table 3 below illustrates an example of database table 530. Notice the Pattern argument has an id '6' and a foreign key id '9'. This indicates that the Pattern argument (in database table 530) applies to the File Exclusion policy (in database table 520). In this example, the File Exclusion policy has no default value for the Pattern argument. The absence of a default means that no file will be excluded.

TABLE 3

| id | name | policy_id | default_value |
|----|------|-----------|---------------|
| 1  | Number of Copies | 1 | 1 |
| 3  | Timeout | 7 | 60 |
| 6  | Pattern | 9 | |
| 7  | Enabled | 3 | true |
| 4  | Timeout | 8 | 480 |
| 10 | Prevent Delete | 10 | false |
| 8  | Number of Export Copies | 11 | 0 |
| 9  | Replicate | 12 | false |
| 2  | Stub Size | 2 | 2097152 |

In one embodiment, database table 540 is configured for providing an association between directories in the file system and the policies for that directory. As discussed above, when a user creates a file share, the share is associated with a specific directory in the file system and policies defined for a share can be applied to the associated directory. Thus, there will be one record in database table 540 for each policy applied to each directory (share). As illustrated in FIG. 5, database table 540 may comprise a column 'directory_id' for identifying each top level directory associated with a file share created by the user. This is the foreign key id of the directory in the nodes table (database table 510). Database table 540 may further comprise a column 'policy_id' for identifying a policy applicable to the associated share. This is the foreign key id of a policy in the policies table (database table 520). Table 4 below illustrates an example of database table 540. In this example, the top-level directory for the file share (directory_id '3') has several policies associated therewith. The record with an id '10' shows that directory_id '3' is associated with the File Exclusion policy (policy_id '9').

TABLE 4

| id | directory_id | policy_id |
|----|--------------|-----------|
| 1  | 1 | 3 |
| 2  | 2 | 3 |
| 3  | 1 | 8 |
| 4  | 2 | 8 |
| 5  | 3 | 2 |
| 6  | 3 | 7 |
| 7  | 3 | 3 |
| 8  | 3 | 8 |
| 9  | 3 | 10 |
| 10 | 3 | 9 |
| 11 | 3 | 11 |
| 12 | 3 | 12 |

In one embodiment, database table 550 is configured for storing the specific values for policy arguments as they pertain to a specific directory/policy combination. As illustrated in FIG. 5, database table 550 may comprise columns 'directory_policy_id', 'policy_argument_id', and 'value'. 'directory_policy_id' may store the foreign key id of the directory/policy combination in the directory_policies table (database table 540). 'policy_argument_id' may store the foreign key id of the argument in the policy_arguments table (database table 530). 'value" may store the specific value for the policy as applied to the directory. Table 5 below illustrates an example of database table 550. In this example, the records with ids 13 and 14 indicate that the directory/policy combination specified in the directory_policies table (database table 540) at id '10' has values for the policy_argument_id '6'. This means that the directory with the name '3dc61e41-5ef8-4392-85a6-97c432c8019e' (directory_policy_id '10' points to directory_id '3') has a File Exclusion policy (directory_policy_id '10' also points to policy_id '9') with values for the Pattern argument (policy_argument_id '6') of "._*" and "*.log".

TABLE 5

| id | directory_policy_id | policy_argument_id | value |
|----|---------------------|--------------------|----|
| 1  | 1  | 7  | compressed |
| 2  | 2  | 7  | compressed |
| 3  | 3  | 4  | 480 |
| 4  | 4  | 4  | 480 |
| 5  | 5  | 2  | 2097152 |
| 6  | 6  | 3  | 60 |
| 7  | 7  | 7  | true |
| 8  | 8  | 4  | 480 |
| 9  | 9  | 10 | false |
| 10 | 10 | 1  | 2 |
| 11 | 11 | 8  | 0 |
| 12 | 12 | 9  | false |
| 13 | 10 | 6  | ._* |
| 14 | 10 | 6  | *.log |

Values for the Pattern argument may be in various formats. As an example, in one embodiment, a user may be allowed to specify a list of patterns in the UNIX glob format. As those skilled in the art can appreciate, a glob refers to a particular pattern used in pattern matching on filenames. In computer programming, globbing may refer to a limited pattern matching function that can expand file names using a glob much like regular expression syntax but without the expressive power of regular expressions. Non-limiting examples of globs may include *.log(applicable to all log files), *.xls (applicable to all Excel spreadsheets), and *.doc (applicable to all Word documents), etc.

In one embodiment, the user is allowed to specify a list of patterns in the UNIX glob format for each share. When a file is written to that share, the archiving application (also referred to as Disk Tape File System or DTFS software) for the Archive Node Appliance checks the file name against each pattern in the user-specified list. If it matches any of the patterns, the file is excluded from archiving. As a result of this action, the file will not be written to tape, the complete file will remain on disk in the Archive Node Appliance, and it will not be locked down as read-only. Indeed, due to the File Exclusion policy, this file will only exist on the Archive Node Appliance (on the disk) and will never be written to tape, never be made read only, and never be replicated.

In one embodiment, this can be a general purpose system for controlling the Archive Node Appliance's behavior on a per-share basis. In some embodiments, the granularity of such a control can be increased to individual directories or even individual files on the share. As discussed above, a set of policies is defined in the policies table in the database. As new shares are added to the Archive Node Appliance, a set of directory policies is created for each new share. One of these policies can be a file exclusion policy. These directory policies, contained in the directory_policies table in the database described above, effectively serve as an instance for each policy for each share. The arguments for each policy are defined in the policy_arguments table and the argument values for each policy are contained in the policy-values table. As Table 5 above illustrates, some arguments, such as the list of filename patterns to exclude from archiving, may have multiple entries in the policy_values table for each directory policy.

Figure 6:
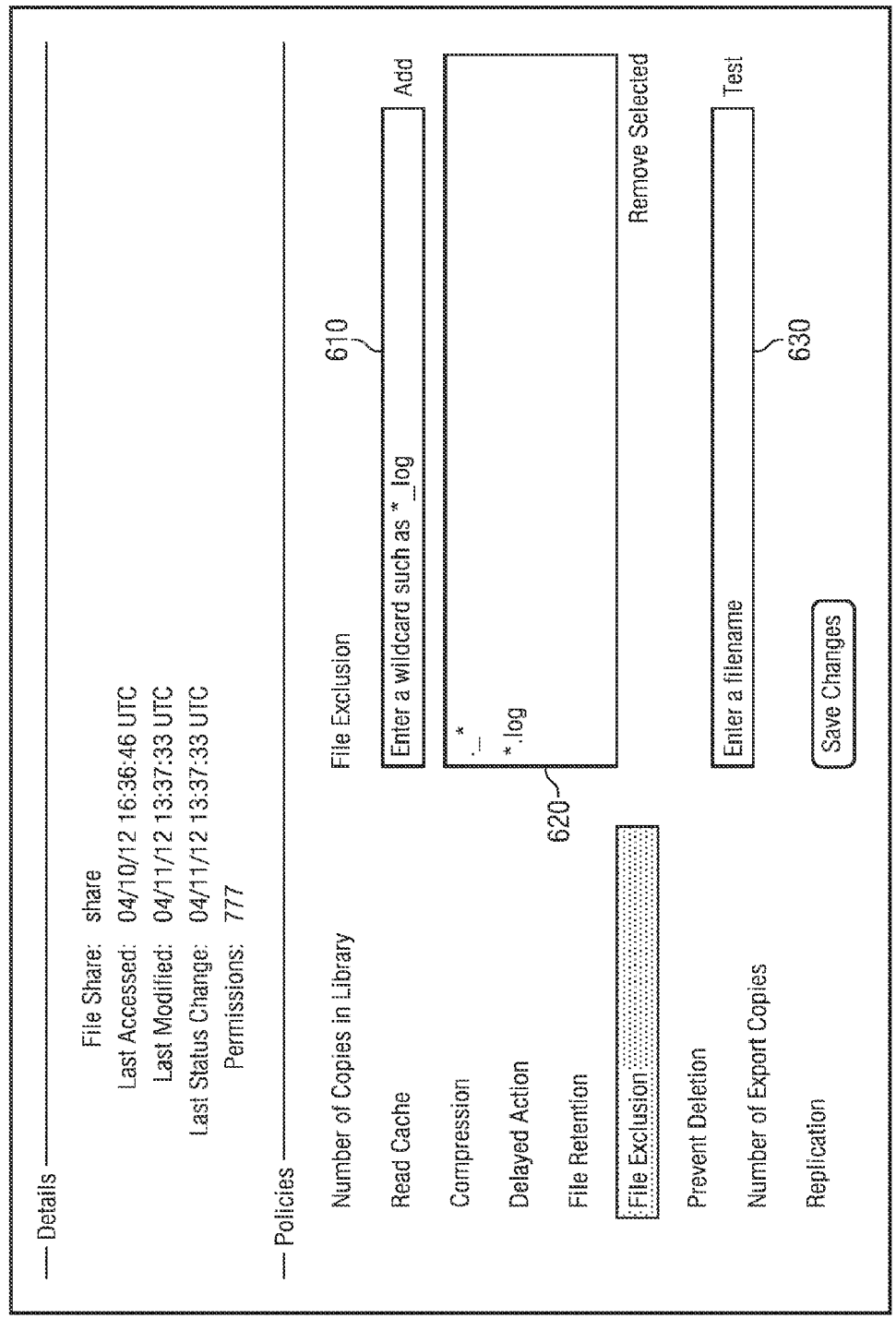
FIG. 6 depicts a diagrammatic representation of one embodiment of a user interface for the file exclusion policy.

In some embodiments, the Archive Node Appliance may comprise a user interface (UI) through which a user can set the policy argument values for each share. FIG. 6 depicts a diagrammatic representation of one embodiment of a user interface for the file exclusion policy. In this example, user interface 600 may comprise input box 610 through which a pattern can be added to the file exclusion policy. User interface 600 may further comprise window 620 showing pattern(s) that have been added to the exclusion policy. As FIG. 6 illustrates, the user can select and remove a pattern or patterns from the exclusion policy via window 620. Test input field 630 may allow the user to enter a file name to test the file exclusion policy.

When the user specifies a list of exclusion patterns via the UI, the patterns are stored as entries in the policy-values table, associated with an entry in the directory_policies table, which in turn links the share to an instance of the file exclusion policy. Referring to FIG. 4, the file exclusion policy may then be applied in conjunction with the migration of the file at step 450. For example, in one embodiment, the archiving application for the Archive Node Appliance can be configured to determine, at runtime, whether or not to archive a given file. In making this determination, the archiving application may check the file name against the exclusion patterns which can be specified by the user and which are stored in the policy-values table. As a specific example, in one embodiment, the file migration module may first determine the share on which the file resides. It may then query the database for a directory policy associating that share with the file exclusion policy. If such an association is found, it queries the database for the policy values for that share's file exclusion policy. As described above, in one embodiment, these values can be interpreted as UNIX globs, and the name of the file under consideration is checked against them. If the file's name matches any of the globs, then the file will be excluded from archiving and the archiving process with respect to this file effectively terminates at step 450.

The methodology described above can allow certain files to remain, in their complete form, on the Archive Node Appliance and prevent certain files from being inadvertently archived. For example, a user may desire to use an archiving system more like a network attached storage device and may wish to keep all the files with an extension of .xyz (which are already in the archiving system) to remain in the data store of the Archive Node Appliance. The user may add *.xyz to the file exclusion policy as described above to prevent such files from migrating to a tape or another Archive Node Appliance. Likewise, the user may add to the file exclusion policy a pattern or patterns known to be used by certain software applications to create temporary files in the course of normal operations. Any temporary files matching the pattern or patterns specified in the file exclusion policy will not be queued for archiving and thus will not be locked down as read-only. By preventing certain files from being inadvertently archived, the software applications that created them can continue to perform properly.

A computer program product implementing the method described above may comprise at least one non-transitory computer readable medium storing instructions translatable by a processor to perform the method. Embodiments disclosed herein may implement any suitable computer readable medium, including those known in the art (e.g., optical disk, magnetic disk, flash memory, RAM, ROM, EEPROM or other computer readable medium). Additionally, embodiments may be implemented as hardware, software programming or some combination thereof. For example, a system implementing the method may be implemented in standalone devices, routing devices such as routers, bridges, hubs or other types of network devices. In one embodiment, the system comprises an archive node appliance.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. An archiving appliance device, comprising:
   ports for connecting to one or more hosts via one or more networks and to a tape library comprising one or more tape drives;
   a processor;
   at least one non-transitory computer readable medium storing instructions translatable by the processor to:
   start an archiving process including migrating a file from the archiving appliance device over a network connection onto a tape in the tape library, the archiving appliance device and the tape library being part of an archiving system, the file being stored in a directory on the device, the directory being associated with a file exclusion policy, wherein the file exclusion policy is stored on the at least one non-transitory computer readable medium, wherein the file exclusion policy identifies one or more patterns of file names;
   determine whether a name of the file matches a pattern contained in the file exclusion policy, indicating that the file is a temporary file in the archiving system and is to be excluded from migrating to the tape library or to another archiving system on the one or more networks; and
   terminate the archiving process if the file exclusion policy indicates that the file is to be excluded from the migrating, wherein the file excluded from the migrating is not replicated and wherein after the archiving process is terminated, the file exists only on the archiving appliance device and is never migrated from the archiving appliance device.

2. The archiving appliance device of claim 1, wherein the instructions are further translatable by the processor to provide a user interface through which one or more patterns are added to or removed from the file exclusion policy.

3. The archiving appliance device of claim 1, wherein the directory represents a shared volume on the archiving appliance device.

4. The archiving appliance device of claim 3, wherein the file exclusion policy is one of a plurality of file exclusion policies associated with the shared volume, each of the plurality of file exclusion policies specifying a set of patterns.

5. The archiving appliance device of claim 3, further comprising:
a data store storing a plurality of policies associated with the directory, the plurality of policies comprising the file exclusion policy.

6. A method for preventing files in an archiving system from migrating, comprising:
at an archiving appliance device connected to a tape library comprising one or more tape drives over a network connection, starting an archiving process including migrating a file from the archiving appliance device over a network connection onto a tape in the tape library, the archiving appliance device and the tape library being part of an archiving system, the file being stored in a directory on the archiving appliance device, the directory being associated with a file exclusion policy, wherein the file exclusion policy is stored on the at least one non-transitory computer readable medium, wherein the file exclusion policy identifies one or more patterns of file names;
determining whether a name of the file matches a pattern contained in the file exclusion policy, indicating that the file is a temporary file in the archiving system and is to be excluded from migrating to the tape library or to another archiving system; and
terminating the archiving process if the file exclusion policy indicates that the file is to be excluded from the migrating, wherein the file excluded from the migrating is not replicated and wherein after the archiving process is terminated, the file exists only on the archiving appliance device and is never migrated from the archiving appliance device.

7. The method according to claim 6, wherein the name of the file is different from a filename contained in a request received at the archiving appliance device to store the file in the archiving system.

8. The method according to claim 6, further comprising:
receiving at the archiving appliance device a request to store the file in the tape library, the file being associated with a first name and a first path as visible through a network based file system implemented by the archiving appliance device; and
storing the file in a second name and a second path in the directory on the archiving appliance device.

9. The method according to claim 6, further comprising adding one or more patterns to the file exclusion policy via a user interface.

10. The method according to claim 6, further comprising removing one or more patterns from the file exclusion policy via a user interface.

11. The method according to claim 6, wherein the directory represents a shared volume on the archiving appliance device, further comprising:
associating a plurality of file exclusion policies with the shared volume, each of the plurality of file exclusion policies specifying a set of patterns.

12. A computer program product comprising at least one non-transitory computer readable medium storing instructions translatable by a processor to perform:
at an archiving appliance device connected to a tape library comprising one or more tape drives over a network connection, starting an archiving process including migrating a file from the archiving appliance device over a network connection onto a tape in the tape library, the archiving appliance device and the tape library being part of an archiving system, the file being stored in a directory on the archiving appliance device, the directory being associated with a file exclusion policy, wherein the file exclusion policy is stored on the at least one non-transitory computer readable medium, wherein the file exclusion policy identifies one or more patterns of file names;
determining whether a name of the file matches a pattern contained in the file exclusion policy, indicating that the file is a temporary file in the archiving system and is to be excluded from migrating to the tape library or to another archiving system; and
terminating the archiving process if the file exclusion policy indicates that the file is to be excluded from the migrating, wherein the file excluded from the migrating is not replicated and wherein after the archiving process is terminated, the file exists only on the archiving appliance device and is never migrated from the archiving appliance device.

13. The computer program product of claim 12, wherein the instructions are further translatable by the processor to provide a user interface through which one or more patterns are added to or removed from the file exclusion policy.

14. The computer program product of claim 12, wherein the directory represents a shared volume on the archiving appliance device and wherein the instructions are further translatable by the processor to perform associating a plurality of file exclusion policies with the shared volume, each of the plurality of file exclusion policies specifying a set of patterns.

* * * * *